(12) United States Patent
Friedrich et al.

(10) Patent No.: US 11,877,714 B2
(45) Date of Patent: Jan. 23, 2024

(54) WATER MANAGEMENT SYSTEM

(71) Applicant: Black & Decker, Inc., New Britain, CT (US)

(72) Inventors: Andreas Friedrich, Limburg (DE); Robin Märte, Überlingen (DE)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/530,955

(22) Filed: Nov. 19, 2021

(65) Prior Publication Data
US 2022/0151448 A1 May 19, 2022

(30) Foreign Application Priority Data
Mar. 5, 2021 (GB) .................................. 2103094.5

(51) Int. Cl.
*A47L 7/00* (2006.01)
*A47L 5/36* (2006.01)
*A47L 9/28* (2006.01)
*A47L 9/24* (2006.01)

(52) U.S. Cl.
CPC ............. *A47L 7/0033* (2013.01); *A47L 5/365* (2013.01); *A47L 7/0019* (2013.01); *A47L 7/0095* (2013.01); *A47L 9/248* (2013.01); *A47L 9/2868* (2013.01)

(58) Field of Classification Search
CPC ...... A47L 7/0033; A47L 5/365; A47L 7/0019; A47L 7/0095; A47L 7/0004; A47L 9/248; A47L 9/2868; A47L 7/0038; A47L 11/29; A47L 11/30; A47L 11/4025
USPC ....................................................... 155/320
See application file for complete search history.

(56) References Cited

U.S. PATENT DOCUMENTS 4,179,768 A * 12/1979 Sawyer ................. A47L 7/0042
15/352
4,976,850 A 12/1990 Kulitz
6,119,304 A * 9/2000 Berfield .................... A47L 5/22
15/352

(Continued)

FOREIGN PATENT DOCUMENTS

DE 10202933 A1 8/2003
DE 102019002670 A1 10/2020

OTHER PUBLICATIONS

Extended European Search Report, dated Apr. 21, 2022, for related EP Application No. 21203634.7-1016.

*Primary Examiner* — Eric J Rosen
*Assistant Examiner* — Tyler James McFarland
(74) *Attorney, Agent, or Firm* — Scott B. Markow

(57) ABSTRACT

A wet-dry vacuum device assembly comprises a housing and a motor-fan assembly mounted in the housing. The motor-fan assembly is arranged to generate an air flow along an airflow path between a dirty air inlet and a clean air exhaust. The wet-dry vacuum device comprises a tank positioned along the airflow path and arranged to capture liquid entrained in the dirty air flow. The wet-dry vacuum device further comprises a removable pump accessory mountable to the housing. The removable pump accessory comprises pump and a fluid inlet in fluid communication with the tank and the pump. A fluid outlet is in fluid communication with the pump and connectable to an exterior hose. The pump is arranged to move captured liquid in the tank from the fluid inlet to the fluid outlet.

20 Claims, 11 Drawing Sheets

(56) References Cited

U.S. PATENT DOCUMENTS

| | | | |
|---|---|---|---|
| 7,779,505 B2 | 8/2010 | Krebs et al. | |
| 2002/0066153 A1* | 6/2002 | Sclafani | A47L 11/4044 134/21 |
| 2006/0123587 A1* | 6/2006 | Parr | A47L 11/34 15/320 |

* cited by examiner

WATER MANAGEMENT SYSTEM

CROSS-REFERENCE TO RELATED APPLICATIONS

This application claims priority to European Patent Application EP 2018184.8, filed on Nov. 19, 2020, and UK Patent Application GB 2103094.5, filed on Mar. 5, 2021, each of which are incorporated herein by reference in their entireties.

TECHNICAL FIELD

The present disclosure relates to a wet-dry vacuum device assembly and pump accessory. In particular, the present disclosure relates to a construction site or tool shop vacuum.

BACKGROUND

Tool shop vacuum cleaners such as wet-dry vacuum cleaners are designed to collect debris from a work area or from a tool via a connected suction hose. This means the work area can be kept free from debris such as sawdust or other waste material. Such a wet-dry vacuum cleaner is shown in EP 2 644 072.

In some circumstances, operation of the tool may require a flow of cooling or lubricating liquid e.g. water to be introduced in the vicinity of the cutting blade of a tile saw. In this case, the wet-dry vacuum cleaner can be used to collect the run-off water and debris from the work area. In this case, water or other liquids are entrained in the air flow and deposited in a tank of the wet-dry vacuum cleaner.

The wet-dry vacuum cleaner should be emptied when the tank becomes full. This may need to be carried out frequently if the tool operation requires a flow of cooling or lubricating liquid for an extended period of time. Providing a constant flow of running water during operation of the tool can increase water consumption in the work area and increase waste water flow into the sewer system. This may be undesirable especially when conservation of water is increasingly important.

SUMMARY

Examples of the present disclosure aim to address the aforementioned problems.

According to an aspect of the present disclosure there is a wet-dry vacuum device assembly comprising: a housing; a motor-fan assembly mounted in the housing and arranged to generate an air flow along an airflow path between a dirty air inlet and a clean air exhaust; a tank positioned along the airflow path and arranged to capture liquid entrained in the dirty air flow; and a removable pump accessory mountable to the housing, the removable pump accessory comprising: a pump; a fluid inlet in fluid communication with the tank and the pump; a fluid outlet in fluid communication with the pump and connectable to an exterior hose; wherein the pump is arranged to move captured liquid in the tank from the fluid inlet to the fluid outlet.

Optionally, the removable pump accessory comprises a frame mountable to the housing.

Optionally, the pump is mounted in a pump housing and the pump housing is integral with the frame.

Optionally, the housing comprises a body portion and a lid mountable on the body portion and at least a portion of the frame is mountable between the body portion and the lid.

Optionally, one or more latches are mounted on the body portion and/or the lid and engageable with at least a portion of the frame.

Optionally, the frame comprises at least one seal for sealing against the body portion and/or the lid.

Optionally, the removable pump accessory comprises a plurality of projecting leg portions arranged to align against an inner surface of the housing.

Optionally, the wet-dry vacuum device assembly comprises a vacuum hose in fluid communication with the dirty air inlet and the vacuum hose is positionable adjacent to the exterior hose.

Optionally, the wet-dry vacuum device assembly comprises a vacuum hose in fluid communication with the dirty air inlet and the vacuum hose and the exterior hose are a single hose accessory.

Optionally, the exterior hose is mounted within the vacuum hose.

Optionally, the pump comprises a separate power supply to the motor-fan assembly.

Optionally, the pump is electrically connectable to the same power supply as the motor-fan assembly.

Optionally, the wet-dry vacuum device assembly comprises an actuator configured to actuate the motor-fan assembly and the pump.

Optionally, the fluid inlet comprises an inlet hose extending to the bottom of the tank.

Optionally, the removable pump accessory comprises a filter arranged to remove debris entrained in the dirty airflow.

Optionally, the filter is positioned between the fluid inlet and the pump.

Optionally, the pump is a self-priming pump.

In a second aspect of the disclosure, there is provided a pump accessory for a wet-dry vacuum device, the pump accessory being removably mountable to a housing of the wet-dry vacuum device, the pump accessory comprising: a pump; a fluid inlet in fluid communication with a tank of the wet-dry vacuum device arranged to capture liquid entrained in a dirty air flow and the pump; a fluid outlet in fluid communication with the pump and connectable to an exterior hose; wherein the pump is arranged to move captured liquid in the tank from the fluid inlet to the fluid outlet.

In a third aspect of the disclosure there is a wet-dry vacuum device assembly comprising: a housing; a motor-fan assembly mounted in the housing and arranged to generate an air flow along an airflow path between a dirty air inlet and a clean air exhaust; a tank positioned along the airflow path and arranged to capture liquid entrained in the dirty air flow; and a removable pump accessory mountable to the housing, the removable pump accessory comprising: a pump; a fluid inlet in fluid communication with the tank and the pump; a fluid outlet in fluid communication with the pump and connectable to an exterior hose; wherein the pump is arranged to move captured liquid in the tank along a liquid flow path from the fluid inlet to the fluid outlet; and a water filter accessory positioned on the liquid flow path on a fluid inlet side of the pump.

Optionally, the water filter accessory is mountable to the removeable pump accessory or over the dirty air inlet on housing.

In a fourth aspect of the disclosure there is a water filter accessory for wet-dry vacuum device, the water filter accessory comprises: a body having at least one coupling for removably connecting the water filter accessory to a pump accessory comprising: a pump; a fluid inlet in fluid communication with a tank of the wet-dry vacuum device arranged to capture liquid entrained in a dirty air flow and the pump; a fluid outlet in fluid communication with the pump and connectable to an exterior hose; wherein the pump is arranged to move captured liquid in the tank along a liquid flow path from the fluid inlet to the fluid outlet; wherein the water filter accessory comprises a filter medium mounted on the body and the filter medium is positionable on the liquid flow path on a fluid inlet side of the pump.

BRIEF DESCRIPTION OF THE DRAWINGS

Various other aspects and further examples are also described in the following detailed description and in the attached claims with reference to the accompanying drawings, in which:

DETAILED DESCRIPTION

Figure 1:
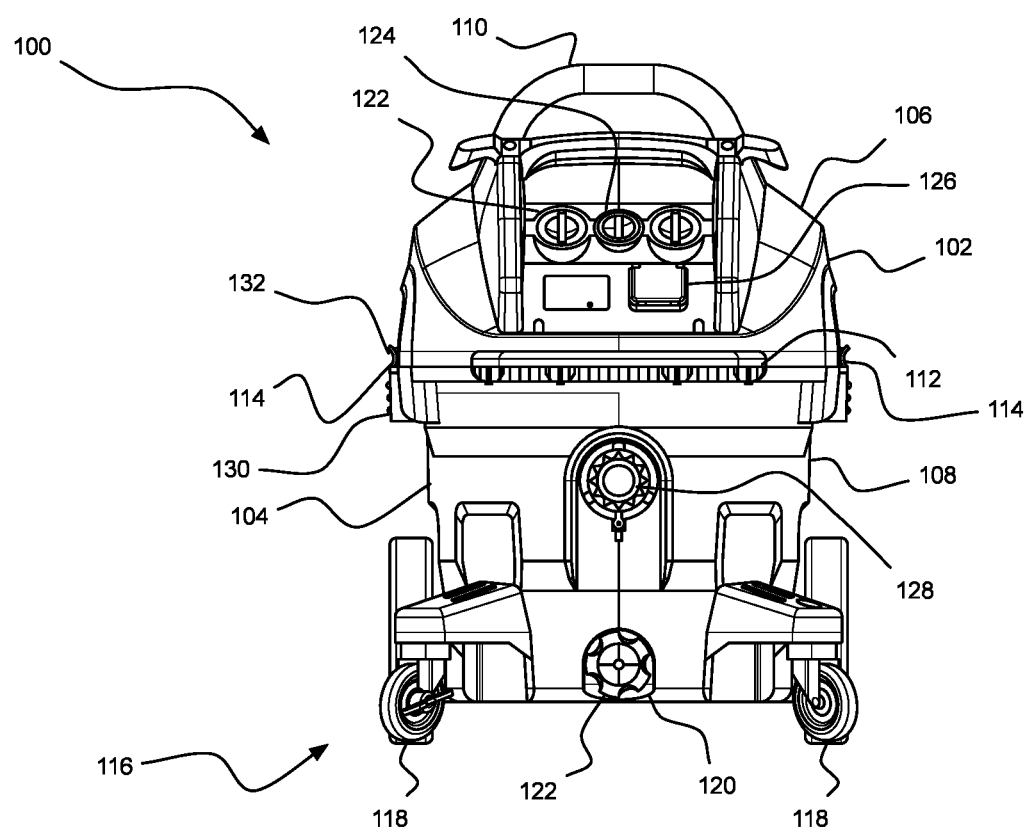
FIG. 1 shows a side view of a wet-dry vacuum device according to an example.

FIG. 1 shows a side view of a wet-dry vacuum device 100 according to an example. In some examples the wet-dry vacuum device 100 is a vacuum device arranged to be used on a construction site or in a tool shop.

The wet-dry vacuum device 100 comprises a housing 102. The housing 102 comprises a lower housing portion 104 and an upper lid portion 106. The upper lid portion 106 is securable to the lower housing portion 104 as discussed in further detail below. The upper lid portion 106 can be separated from the lower housing portion 104 to empty the wet-dry vacuum device 100. Furthermore, the upper lid portion 106 can be removed from the lower housing portion 104 to conduct maintenance and cleaning of the wet-dry vacuum device 100.

Figure 5:
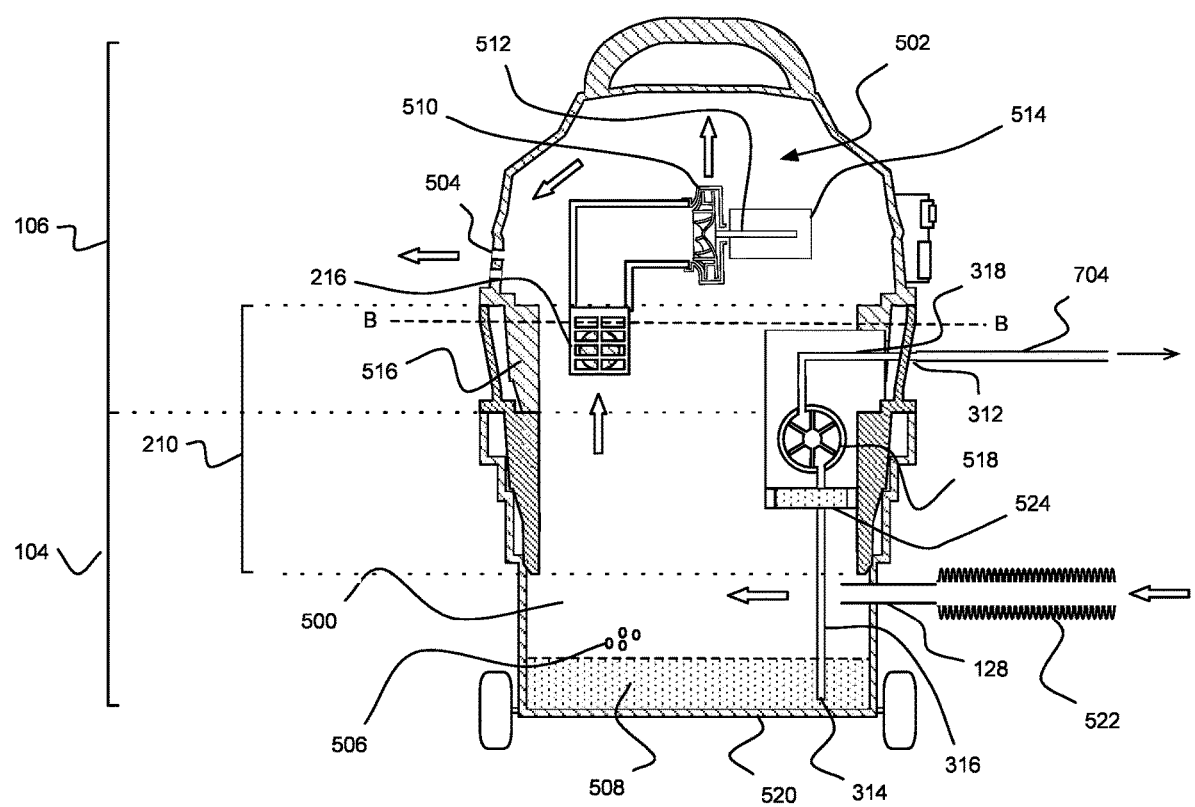
FIGS. 5, 6 and 7 show schematic side cross-sectional views of a wet-dry vacuum device and a pump accessory therefor.

The lower housing portion 104 comprises a tank 500 for receiving liquid and debris entrained in the dirty airflow. The tank 500 can be best seen from FIG. 5. FIG. 5 shows a schematic side cross-sectional view of a wet-dry vacuum device 100. The tank 500 may possess any dimensions and shapes suitable for receiving debris and liquid.

Turning back to FIG. 1, in an example the lower housing portion 104 and the tank 500 are generally cylindrical. In another example, the tank 500 may possesses a generally frustoconical shape. Additionally or alternatively, the tank 500 may include one or more curved (not shown) side walls 108. In other examples, the wet-dry vacuum device 100 can comprise any suitable shape. For example, the wet-dry vacuum device 100 can be an elongate shape whereby the length of the housing 102 is greater than the height of the housing 102.

Optionally, (although not shown in FIG. 5), an interior surface of a base 520 of the lower housing portion 104 and the tank 500 may be generally concave. For example, the bottom of the lower housing portion 104 and the tank 500 may possess a slightly upward curve to, e.g., prevent the tank 500 from sagging when filled with a predetermined amount of debris and/or liquid.

Figure 2:
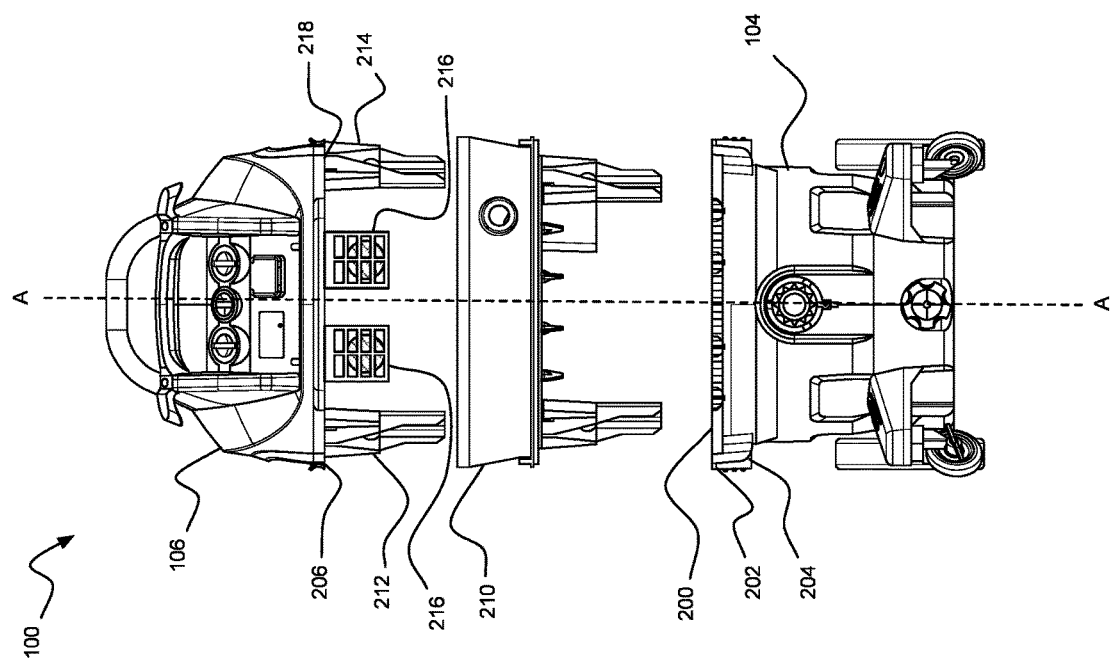
FIG. 2 shows a side view of a wet-dry vacuum device and a pump accessory therefor according to an example.

In some examples, the lower housing portion 104 comprises a tank mouth 200 (as shown in FIG. 2). FIG. 2 shows a side view of the wet-dry vacuum device 100 according to an example. FIG. 2 shows the parts of the wet-dry vacuum device 100 aligned along a central longitudinal axis A-A. The tank mouth 200 defines a housing rim 202 which may protrude radially outward from the side wall 108, thereby forming a lip 204 about the tank mouth 200 of the tank 500. The housing rim 202 is configured to engage against a reciprocal lid rim 206 on the upper lid portion 106. In this way, the tank 500 defines an open cavity or collection chamber configured to collect and store debris or liquid sucked therein.

In the configuration as shown in FIG. 1, the wet-dry vacuum device 100 is arranged in a wet-dry vacuum mode. That is, the wet-dry vacuum device 100 is arranged to generate a negative pressure with a motor-fan assembly 502 (as best shown in FIG. 5) and create an airflow. The generated airflow air is configured to move along an airflow path between a dirty air inlet 128 and a clean air exhaust holes 504. The tank 500 is positioned along the airflow path and arranged to capture liquid droplets 506 entrained in the dirty airflow. The captured liquid 508 (and other debris) collects at the bottom of the tank 500.

Although not shown, the airflow path may optionally be positioned along a path which changes direction. The airflow path may optionally be positioned along one or more baffles (not shown). Changing the direction of the airflow path and/or positioning one or more baffles along the airflow path causes the liquid droplets 506 to fall out of the airflow and collect in the tank 500.

However, use of the wet-dry vacuum device 100 can be performed in either a dry mode operation or the wet mode operation. The dry mode operation is known and will not be discussed any further. The wet-dry vacuum device 100 is discussed hereinafter used in the wet mode operation. In the wet mode operation, one or more filters (not shown) are removed from the wet-dry vacuum device 100 as discussed in more detail below.

In some examples, the lower housing portion 104 optionally comprises a drainage port 120 in fluid connection with the tank 500. The drainage port 120 may comprise a screw cap 122 for blocking the drainage port 120 during operation of the wet-dry vacuum device 100. In this way, the captured liquid 508 held in the tank 500 during operation of the wet-dry vacuum device 100 can be drained from the tank 500 via the drainage port 120 once operation of the wet-dry vacuum device 100 is completed. In some examples, the lower housing portion 104 does not have a drainage port 120 and the tank 500 is emptied by pouring the captured liquid 508 out from the tank mouth 200.

Figure 6:
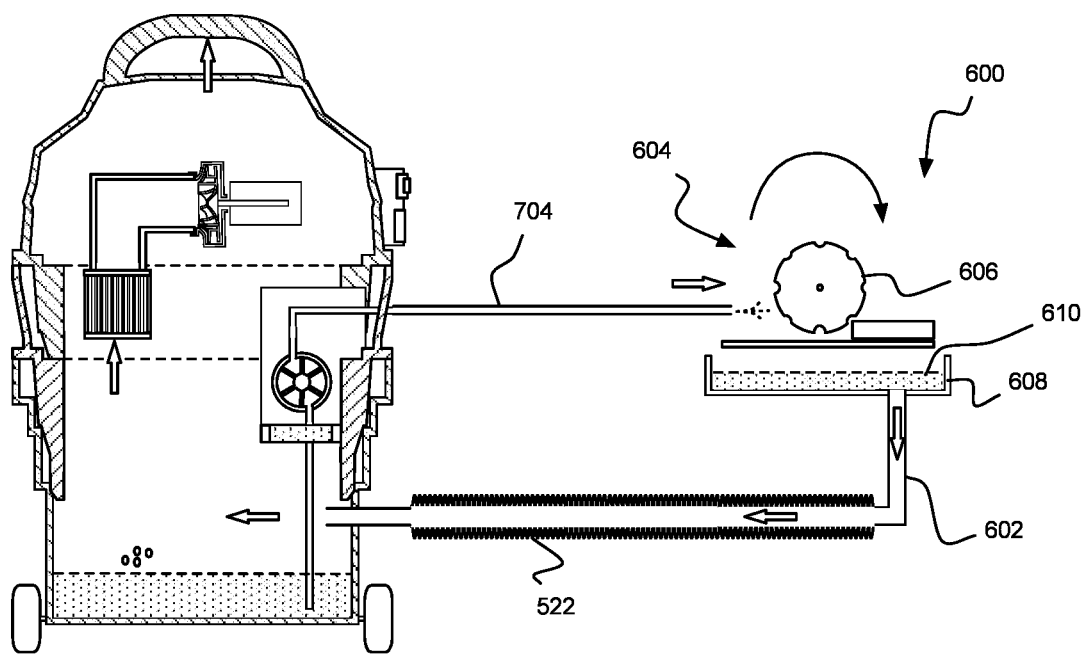

In some examples, the dirty air inlet 128 is configured to be coupled to a vacuum hose 522. One or more nozzles 602 is shown in FIG. 6. FIG. 6 shows a schematic side cross-sectional view of a wet-dry vacuum device 100. The nozzles 602 can be attached to the vacuum hose 522 for sucking excess liquid and debris from a work area 600.

In some examples, the nozzle 602 is configured to attach to a cutting tool 604 (as best shown in FIG. 6). For the purposes of clarity, the cutting tool 604 is schematically and partially represented in FIG. 6 as a cutting blade 606. The nozzle 602 can be configured to clip or attach near to the cutting blade 606. FIG. 6 shows the nozzle 602 being attached to a tray 608. However, alternatively, the nozzle 602 can be connected to a nozzle port (not shown) integral with the cutting tool 604.

Figure 7:
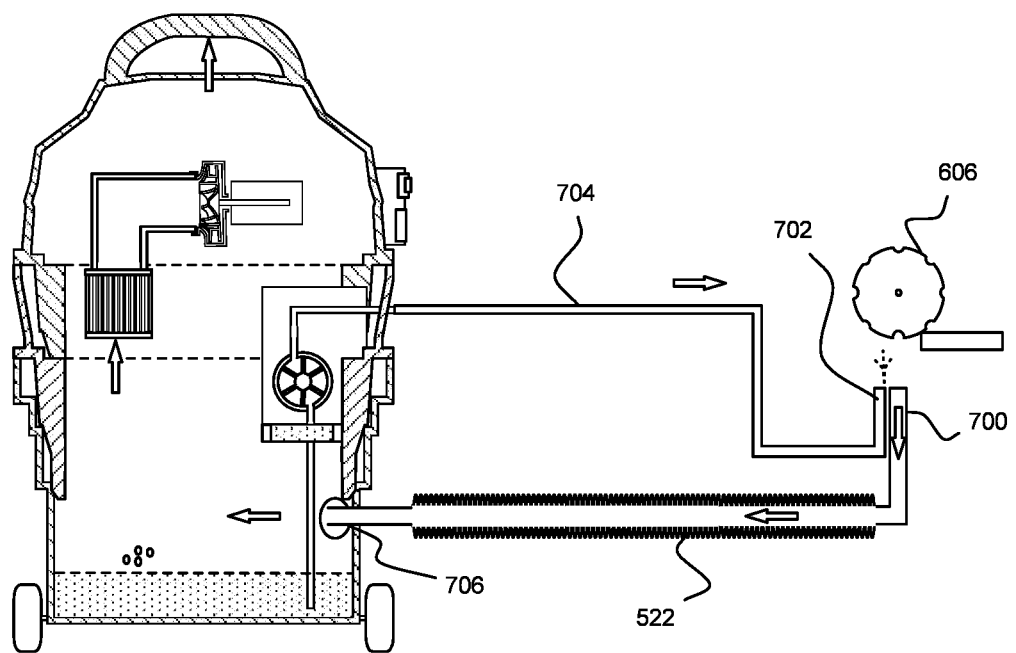

In some other examples, an alternative nozzle 700 (as best shown in FIG. 7) is used. FIG. 7 shows a schematic side cross-sectional view of a wet-dry vacuum device 100. The alternative nozzle 700 shown in FIG. 7 is connected to the vacuum hose 522 and can be fixed to a liquid nozzle 702 of the pump hose 704. The vacuum hose 522 can be fixed to a liquid nozzle 702 and the nozzles 704, 702 may be clipped, glued, fastened, attached together in any other way. By attaching the nozzles 702, 704 together, placement of the pump hose 704 and the vacuum hose 522 next to the cutting tool 604 may be easier. FIGS. 6 and 7 will be discussed in more detail below.

Turning back to FIG. 1, in some examples the lower housing portion 104 and/or the upper lid portion 106 comprise one or more handles. In some examples the upper lid portion 106 comprises a first handle 110 and the lower housing portion 104 comprises a second handle 112. In some examples, the wet-dry vacuum device 100 or the pump accessory 210 (discussed in further detail below) can comprise any number of handles positioned on any surface or orientation of the housing 102.

The lower housing portion 104 may optionally further include one or more latch mechanisms 114 mounted into the side wall 108 of the housing 102. As shown in FIG. 1, there are two latch mechanisms 114 shown mounted to the side walls 108 of the lower housing portion 104. The latch mechanisms 114 selectively secure the upper lid portion 106 to the lower housing portion 104. This means that the lid rim 206 of the upper lid portion 106 engages and seals against the housing rim 202 of the lower housing portion 104. Whilst the Figures described examples comprising two latch mechanisms 114, there can be any number of latch mechanisms 114. For example there can be more than two latch mechanisms 114 circumferentially positioned around the housing 102. Alternatively there can be one latch mechanism 114 opposite a hinge (not shown) pivotally connecting the upper lid portion 106 to the lower housing portion 104.

Each of the latch mechanisms 114 comprise a first latch portion 130 mounted on the lower housing portion 104 and a second latch portion 132 mounted on the upper lid portion 106. The first latch portion 130 and the second latch portion 132 are configured to engage and secure with each other. In some examples, the first latch portion 130 is a pivotally mounted clip 130 on the lower housing portion 104 and the second latch portion 132 is a fixed rib 132 integral with the upper lid portion 106. In some other examples, the pivotally mounted clip and the fixed rib can be respectively mounted on the upper lid portion 106 and the lower housing portion 104.

Optionally, wet-dry vacuum device 100 further includes a transport assembly 116 that enables movement of the wet-dry vacuum device 100 over a surface. In some examples, the wet-dry vacuum device 100 may include one or more wheel assemblies 118 that couple to the lower housing portion 104. In some examples, the transport assembly 116 optionally comprises a brake for preventing the wheel assemblies 118 from moving.

As shown in FIG. 5, the upper lid portion 106 houses a motor-fan assembly 502 configured to generate an airflow between the dirty air inlet 128 and the clean air exhaust holes 504. The motor-fan assembly 502 comprises an impeller 510 mounted on a drive shaft 512 of a motor 514. The motor-fan assembly 502 in some examples is electrically connected to a mains power supply. In some other examples, the motor-fan assembly 502 is electrically connected to a battery pack (not shown).

In the dry mode operation of the wet-dry vacuum device 100 one or more filters can be mounted to the upper lid portion 106 such that the filters are positioned on the airflow path between the dirty air inlet 128 and the clean air exhaust 504. Although not shown in FIG. 5, the filters are mounted on safety valves 216. In order to prepare the wet-dry vacuum device 100 for wet mode operation, the filters are removed from the safety valves 216. The safety valves 216 will be discussed in more detail below.

Referring back to FIG. 1 again, the upper lid portion 106 comprises one or more electrical and electronic components of the wet-dry vacuum device 100. In this way, the wet-dry vacuum device 100 as shown in FIG. 1 comprises a control panel 122 having one or more actuators 124 (e.g., a control knob) operable to control the operational parameters of the device. For example, the control panel 122 is configured to control the power (ON/OFF) and the fan speed of the motor-fan assembly 502 (as shown in FIG. 5). The dashboard may optionally further include one or more power outlets 126 or other power connections (not shown). In this way, a cutting tool 604 can be connected by a power cord and receive electrical power from the wet-dry vacuum device 100. The electrical components may be controlled via a circuit board or a controller (not shown) mounted to the interior surface of the control panel 122 on the upper lid portion 106.

In some examples, the controller is configured to selectively control the ON/OFF switch for the motor-fan assembly 502 in dependence of an external signal. For example, the controller is configured to detect an external signal indicating that actuation of the cutting tool 604 has occurred. On detection of the external signal, the controller is configured to turn the motor-fan assembly 502 on. In this way, the wet-dry vacuum device 100 can be automatically controlled with the cutting tool 604.

In some examples the control panel 122 comprises one or more user input controls (e.g. a control knob) for adjusting the motor-fan assembly 502 speed and the airflow rate. This means that the user can adjust the rate at which the wet-dry vacuum device 100 can suck up dirt, debris and liquid.

Figure 4A:
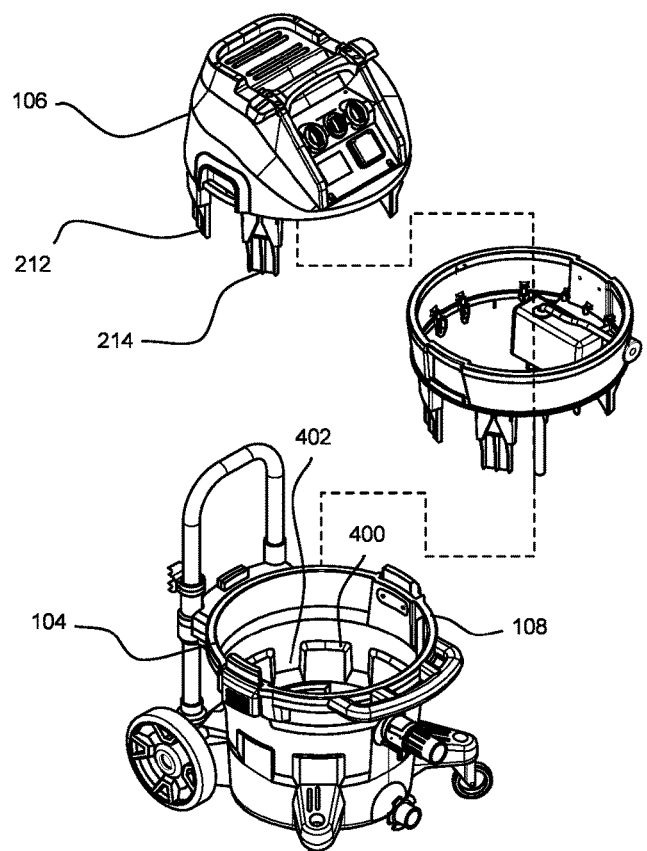
FIGS. 4a and 4b respectively show an exploded and non-exploded perspective views of the wet-dry vacuum device and a pump accessory therefor.

Assembly of the upper lid portion 106 and the lower housing portion 104 of the wet-dry vacuum device 100 will now be discussed. As shown in FIG. 4a, the side wall 108 of the lower housing portion 104 includes one or more guide elements 400. The guide elements 400 in some examples can be a rib or a protrusion from the side wall 108 defining a leg slot 402 for guiding one or more upper legs 212, 214 (as shown in FIGS. 2 and 4a) projecting from a lid base 218 of the upper lid portion 106. FIGS. 2 and 4a only show two upper legs 212, 214 projecting from the lid base 218. However in some examples there are four legs circumferentially spaced around the upper lid portion 106 and four reciprocal leg slots 402 in the lower housing portion 104. In other examples, there can be any number of upper legs 212, 214 and reciprocal leg slots 402.

In some examples, the upper legs 212, 214 are circumferentially located around the edge of the upper lid portion 106. The leg slots 402 are configured to align the upper lid portion 106 with the lower housing portion 104 when coupling them together. When the leg slots 402 receive the upper legs 212, 214, the upper lid portion 106 is seated correctly on the lower housing portion 104.

Turning to FIG. 2, the wet-dry vacuum device 100 will be discussed in further detail. FIG. 2 shows side view of the wet-dry vacuum device 100 and a pump accessory 210.

The pump accessory 210 is configured to mount on the wet-dry vacuum device 100 and operate together with the wet-dry vacuum device 100. Operation of the pump accessory 210 together with the wet-dry vacuum device 100 provides an enhanced wet mode operation. Operation of the pump accessory 210 together with the wet-dry vacuum device 100 will be discussed in further detail below.

Figure 4B:
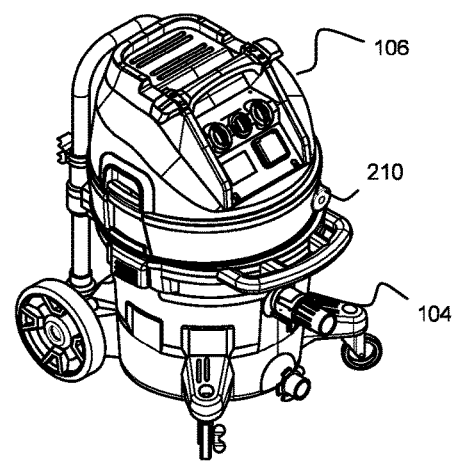

In some examples, the pump accessory 210 is configured to couple to the lower housing portion 104. At the same time the pump accessory 210 is configured to couple to the upper lid portion 106. In this way the pump accessory 210 is configured to be sandwiched between the lower housing portion 104 and the upper lid portion 106. The wet-dry vacuum device 100 assembled together with the pump accessory 210 is shown in FIG. 4b. FIGS. 4a and 4b respectively show the wet-dry vacuum device 100 and the pump accessory 210 in disassembled and assembled configurations.

In some circumstances, operation of a cutting tool 604 may require a flow of cooling or lubricating liquid e.g. water to be introduced in the vicinity of the cutting blade 606. For example, the wet-dry vacuum device 100 and the pump accessory 210 can be used together with a cutting tool 604 such as a tile saw. A tile saw cutting blade 606 requires a constant flow of water over the cutting blade 606 during operation for efficient cutting. In this case, the wet-dry vacuum device 100 and the pump accessory 210 can be used in an enhanced wet mode operation. This means that the wet-dry vacuum device 100 and the pump accessory 210 can be used to collect water and debris from the work area 600 of the cutting tool 604 and then recycle the captured liquid 508 back to the work area 600.

By recycling the captured liquid 508 (e.g. water), the cutting blade 606 can be cooled or lubricated in a remote site without access to running water. This limits the need of the user to constantly empty the tank 500 of the wet-dry vacuum device 100 or the need for a supply of running water. Furthermore, use of the pump accessory 210 together with the wet-dry vacuum device 100 reduces the waste water flow into the sewer system. This improves conservation of water on work sites.

Figure 3:
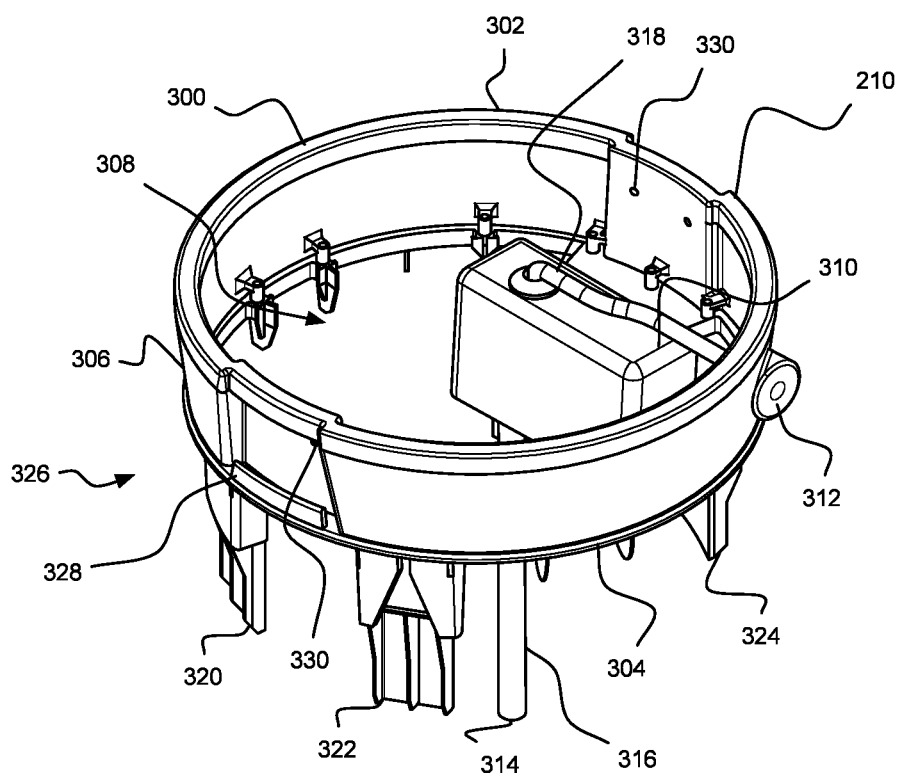
FIG. 3 shows a perspective view of a pump accessory for a wet-dry vacuum device according to an example.

The pump accessory 210 will be discussed in further detail with respect to FIG. 3. FIG. 3 shows a perspective view of the pump accessory 210.

As mentioned above, the pump accessory 210 is configured to couple to both the lower housing portion 104 and the upper lid portion 106. This means that the pump accessory 210 comprises a generally circular cross-sectional shape to match the cross-sectional shapes of both the lower housing portion 104 and the upper lid portion 106.

However, in other examples, the pump accessory 210 comprises a different cross-sectional shape and comprises a reciprocal shape to align with the cross-sectional shapes of the lower housing portion 104 and the upper lid portion 106.

As shown in FIG. 3, the pump accessory 210 comprises a frame 300. The frame 300 comprises a cylindrical wall 306. The frame 300 comprises an upper rim 302 configured for engagement with the lid rim 206 of the upper lid portion 106 and a lower rim 304 configured for engagement with the housing rim 202 of the lower housing portion 104.

When the pump accessory 210 is mounted on the lower housing portion 104, the cylindrical wall 306 forms an extension of the collection chamber. However, in some examples, the level of the captured liquid 508 as shown in FIG. 5 will not normally rise to a level within the pump accessory 210. As discussed above, the upper lid portion 106 of the wet-dry vacuum device 100 comprises safety valves 216 (as shown in FIG. 2). The safety valves 216 are positioned along the airflow path between the dirty air inlet 128 and the clean air exhaust holes 504. The safety valves 216 comprise a floating ball 800 (best shown from FIG. 8) which a configured to float up and block the airflow path in the event that the tank 500 overfills with captured liquid 508. This means that the safety valves 216 protect the electrical and electronic components e.g. the motor-fan assembly 502 mounted in the upper lid portion 106.

The frame 300 of the pump accessory 210 defines an internal space 308. The internal space 308 is configured to receive one or more downwardly projecting elements of the upper lid portion 106. This means that when the pump accessory 210 is mounted to the upper lid portion 106, none of the internal parts of the upper lid portion 106 engage with the pump accessory 210. For example, the safety valves 216 project downwardly into the internal space 308 of the pump accessory 210. This means that the pump accessory 210 can be fitted to existing wet-dry vacuum devices 100. This means that functionality of existing wet-dry vacuum devices 100 can be increased with use of the pump accessory 210. In some examples, one or more filters (not shown) mounted on the safety valves 216 must be removed before the upper lid portion 106 is mounted on the pump accessory 210.

A pump housing 310 is mounted on the frame 300. In some examples, the pump housing 310 is integral with the frame 300. However, in other examples the pump housing 310 is fastened to the frame 300 with screws, bolts, adhesive, clamps or any other suitable fastening. In yet another less preferred example, the pump housing 310 is not attached to the frame 300 and the pump housing 310 is simply placed within the tank 500 when the pump accessory 210 is attached to the lower housing portion 104.

A pump 518 (as best shown in FIG. 5) is mounted in the pump housing 310. The pump 518 is configured to draw the captured liquid 508 from the tank 500 and pump the captured liquid 508 to a fluid outlet 312. The pump 518 is in fluid communication with a fluid inlet 314. The fluid inlet 314 is configured to be positioned within the tank 500. In this way, the fluid inlet 314 is submerged or submergible with the captured liquid 508.

At the start of the operation of the pump accessory 210 and wet-dry vacuum device 100 in the enhanced wet mode operation, the tank 500 may be empty. This means that the user may actuate the motor-fan assembly 502 and suck up water into the tank 500 until sufficient captured liquid 508 is in the tank 500 to submerge the fluid inlet 314. At this point, the user may then actuate the pump 518. Alternatively, the user may fill the tank 500 and submerge the fluid inlet 314 before mounting the pump accessory 210 on the lower housing portion 104. This means that both the motor-fan assembly 502 and the pump 518 can be actuated at the same time to initiate the enhanced wet mode operation.

In some examples, the pump accessory 210 comprises one or more controls for operating the pump 518. In some examples, the pump accessory 210 comprises a control panel (not shown) mounted on the frame 300 similar to the control panel 122 mounted on the upper lid portion 106. The one or more controls for operating the pump 518 may optionally comprise an ON/OFF switch for the pump 518.

Additionally, the one or more controls for operating the pump 518 may optionally comprise a flow rate control configured to adjust the pump rate of the pump 518. In this way, the user can adjust the flow rate at which the pump 518 delivers captured liquid 508 to the cutting tool 604.

In some examples the pump 518 is electrically connected to a mains power supply 810. In some other examples, the pump 518 is electrically connected to a battery pack (not shown). In this way, the pump 518 and the motor-fan assembly 502 can be independently connected to a mains power supply. This means that the pump 518 and the motor-fan assembly 502 can be operated independently. For example, the pump 518 can be operated with the motor-fan assembly 502 inactive. Alternatively, the motor-fan assembly 502 can be operated with the pump 518 inactive.

In some other examples, the pump 518 is electrically connected to an electrical circuit of the wet-dry vacuum device 100. For example, the pump 518 is electrically connected to the circuit board or controller (not shown) mounted to the interior surface of the control panel 122 on the upper lid portion 106. Alternatively, the pump 518 is electrically connectable to the power outlet 126 mounted on the upper lid portion 106.

In some examples, the pump 518 is optionally a low voltage pump 518. Advantageously a low voltage pump 518 is used in order to improve safety for the user. In other examples, any type of pump 518 can be used. The pump accessory 210 comprises a cable and an optional transformer (not shown) for powering the pump 518.

In some examples, the pump 518 is controllable via the control panel 122 mounted on the upper lid portion 106. This means that the user can operate both the wet-dry vacuum device 100 and the pump accessory 210 from the same control panel 122.

In some examples, the pump 518 is selectively actuated by the controller of the wet-dry vacuum device 100. In some examples, the controller is configured to selectively control the ON/OFF switch for the pump 518 in dependence of an external signal. For example, the controller is configured to detect an external signal indicating that actuation of the cutting tool 604 has occurred. On detection of the external signal, the controller is configured to turn the pump 518 on. In this way, the wet-dry vacuum device 100 and/or the pump accessory 210 can be automatically controlled with the cutting tool 604.

In some examples, the controller comprises wireless connectivity and the controller can connect with a smartphone via a wireless protocol e.g. Bluetooth™ or Wi-Fi. The controller is configured to actuate the pump 518 when it receives a wireless signal e.g. a signal from a smartphone or other wireless device. In this way, the pump 518 can be selectively actuated from a remote wireless device.

Turning back to FIG. 3, the structure of the pump accessory 210 will be further described. The fluid inlet 314 is in fluid communication with the pump 518 via an internal inlet hose 316. The internal inlet hose 316 can be flexible and bent so that internal inlet hose 316 contacts the base 520 of the tank 500. The flexible internal inlet hose 316 can be folded within the internal space 308 when the pump accessory 210 is not in use. Alternatively, the internal inlet hose 316 can be replaced with a rigid downpipe (not shown). Accordingly, the fluid inlet 314 is in fluid communication with the tank 500 and the pump 518.

The pump 518 is in fluid communication with the fluid outlet 312 via an internal outlet hose 318. The fluid outlet 312 is an aperture in the cylindrical wall 306 of the frame 300. The fluid outlet 312 provides a liquid flow path through the pump accessory 210. This means that in some examples, existing wet-dry vacuum devices 100 do not have to be modified in order for the pump 518 to pump the captured liquid 508 out of the tank 500.

In some examples the pump 518 is self-priming. This means that the pump 518 is able to suck the capture liquid 508 from the tank 500 into the pump 518 to fill or "prime" the pump 518 before forcing the liquid out of the pump 518. This may be preferable because the pump 518 will be empty of liquid during periods of non-use. In other examples, the user primes the pump 518 and manually sucks up liquid into the pump 518 before use.

In some examples, the pump 518 is configured to pump dirty liquid e.g. dirty water. This means that the contaminated liquid recycled from the cutting tool 604 does not damage the pump 518 during operation of the pump 518.

In some examples, the pump accessory 210 optionally comprises a filter cartridge 524. The filter cartridge 524 is mounted on the pump housing 310 between the fluid inlet 314 and the pump 518. The filter cartridge 524 comprises a mesh, foam, or other suitable barrier to remove dirt, grit and any other particles from the captured liquid 508 before the captured liquid 508 enters the pump 518.

Alternatively, the wet-dry vacuum device 100 comprises a filter bag 706 as shown in FIG. 7. The filter bag 706 is comprises a liquid porous material bag mounted over the dirty air inlet 128. Accordingly in some examples, a filter is positioned between the dirty air inlet 128 and the pump 518 to remove dirt, grit and any other particles from the captured liquid 508 before the captured liquid 508 enters the pump 518.

Figure 11:
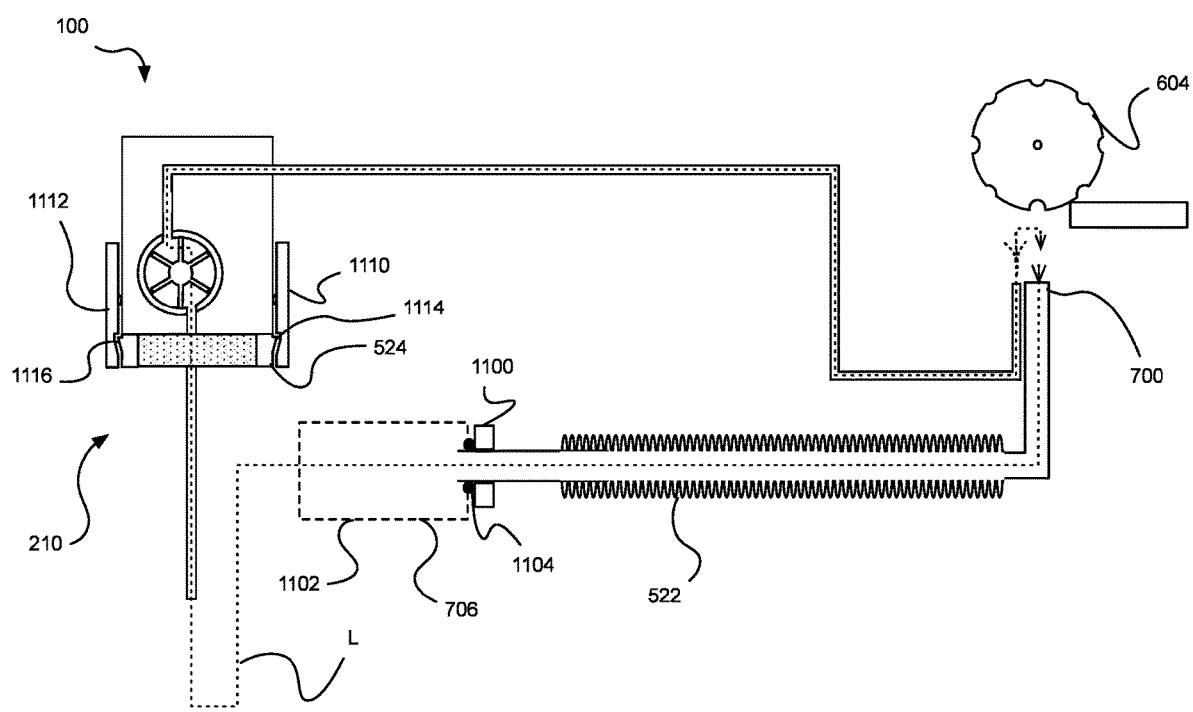
FIG. 11 shows a schematic liquid flow path of a wet-dry vacuum device and a pump accessory therefor according to an example.

The filter bag 706 and the filter cartridge 524 will be discussed in more detail with respect to FIG. 11. FIG. 11 shows a schematic liquid flow path L of a wet-dry vacuum device 100 and a pump accessory 210 according to an example. In some examples, at least one water filter accessory 706, 524 is positioned on the liquid flow path L on a fluid inlet 314 side of the pump 518. In some examples the at least one filter accessory 706, 524 can be positioned anywhere along the liquid flow path L.

In some examples, the at least one water filter accessory 706, 524 is positioned on the liquid flow path L within the wet-dry vacuum device 100. Additionally or alternatively, the at least one water filter accessory 706, 524 is positioned on the liquid flow path L in the pump accessory 210, or the vacuum hose 522. For example, the at least one water filter accessory 706, 524 can be mounted on the nozzle 700 of the vacuum hose 522. Whilst FIG. 11 shows two water filter accessories 706, 524 there can be more water filter accessories 706, 524 as needed. There can be any suitable number of water filter accessories 706, 524.

The liquid flow path L is represented in FIG. 11 by a dotted line which extends from the tool 604 into the wet-dry vacuum device 100 and from the wet-dry vacuum device 100 to the tool 604 again. For the purposes of clarity, only parts of the pump accessory 210 have been shown in FIG. 11 to better show the liquid flow path L.

As shown in FIG. 11, the filter bag 706 is mounted on the dirty air inlet 128 and the filter cartridge 524 is mounted on the pump accessory 210. In some examples, there may be only one water filter accessory. For example, only a filter bag 706 is mounted on the dirty air inlet 128 or only the filter cartridge 524 is mounted on the pump accessory 210.

In some examples, the filter bag 706 comprises a filter bag frame 1100. The filter bag frame 1100 is a rigid structure for holding a filter medium 1102 in a position on the liquid flow path L. The filter medium 1102 in some examples is a fine mesh or fabric which is air and liquid permeable. The filter medium 1102 can comprise a flexible bag construction to aid easy of assembly of the pump accessory 210 and the wet-dry vacuum device 100. The filter medium 1102 removes dirt and debris entrained in the air flow and/or the liquid flow.

In some examples, the filter bag frame 1100 comprising a coupling (not shown) for connecting to the dirty air inlet 128 or the lower housing portion 104 adjacent to the dirty air inlet 128. In some examples, the filter bag frame 1100 slots into a reciprocal recess (not shown) on the inside surface of the lower housing portion 104 adjacent to the dirty air inlet 128. In some examples, the filter bag frame 1100 comprises a seal 1104 for engaging the dirty air inlet 128 or the lower housing portion 104 adjacent to the dirty air inlet 128.

In some examples, the at least one water filter accessory is removeable and replaceable.

As mentioned above, the filter cartridge 524 can be mounted to the pump accessory 210. The filter cartridge 524 can be in addition to or alternative to the filter bag 706. Similar to the filter bag 706, the filter cartridge 524 is mounted on the pump accessory 210 such that the filter cartridge 524 is positioned in the liquid flow path L.

In some examples the filter cartridge 524 comprises a filter cartridge body 1106 which is rigid and configured to hold a filter cartridge medium 1108 in the liquid flow path L. The filter cartridge medium 1108 in some examples is a fine mesh, fabric, or foam which is air and liquid permeable. The filter cartridge medium 1108 can comprise one or more foam layers. The filter cartridge medium 1108 removes dirt and debris entrained in the air flow and/or the liquid flow.

In some examples, the pump accessory 210 comprises a coupling (not shown) for connecting the filter cartridge 524 to the pump accessory 210. In some examples, the coupling is the at least one latch mechanism 1110, 1112 to hold the filter cartridge 524 in place with respect to the pump accessory 210. The latch mechanisms 1110, 1112 are configured to engage with reciprocal projections 1114, 1116 on the pump accessory 210. In some examples, the latch mechanisms 1110, 1112 are sprung biased to provide a snap fit on the filter cartridge 524. A latch mechanism 1110, 1112 can be provided on opposite sides of the pump accessory 210 for retaining the filter cartridge 524. A plurality of latch mechanisms 1110, 1112 can be provided on the pump accessory 210 for retaining the filter cartridge 524.

In other examples, the coupling for the filter cartridge 524 and/or the filter bag 706 can be any suitable mechanism for holding them in place. For example the coupling can be a clip, clamp, screw fastening, glue, slot, rails or any other suitable mechanism.

Alternatively, there is no fluid outlet 312 in the frame 300. In this case, either the lower housing portion 104 or the upper lid portion 106 comprise a fluid outlet (not shown) which is configured to be attached to the internal outlet hose 318 from the pump 518. This is less preferred because attachment of the pump accessory 210 will be more complex than the pump accessory 210 as described in reference to FIG. 3.

In some examples, the internal outlet hose 318 which extends through the vacuum hose 522. In this way, the internal outlet hose 318 is threaded through the vacuum hose 522. This means that the vacuum hose 522 is able to provide both the dirty air flow path from the tool 604 into the wet-dry vacuum device 100 and the liquid flow path from the wet-dry vacuum device 100 to the tool 604. This example maybe less preferred because the internal outlet hose 318 needs to be threaded through the vacuum hose 522. However, at the same time the frame 300 does not need an integral fluid outlet 312 in the cylindrical wall 306.

Figure 8:
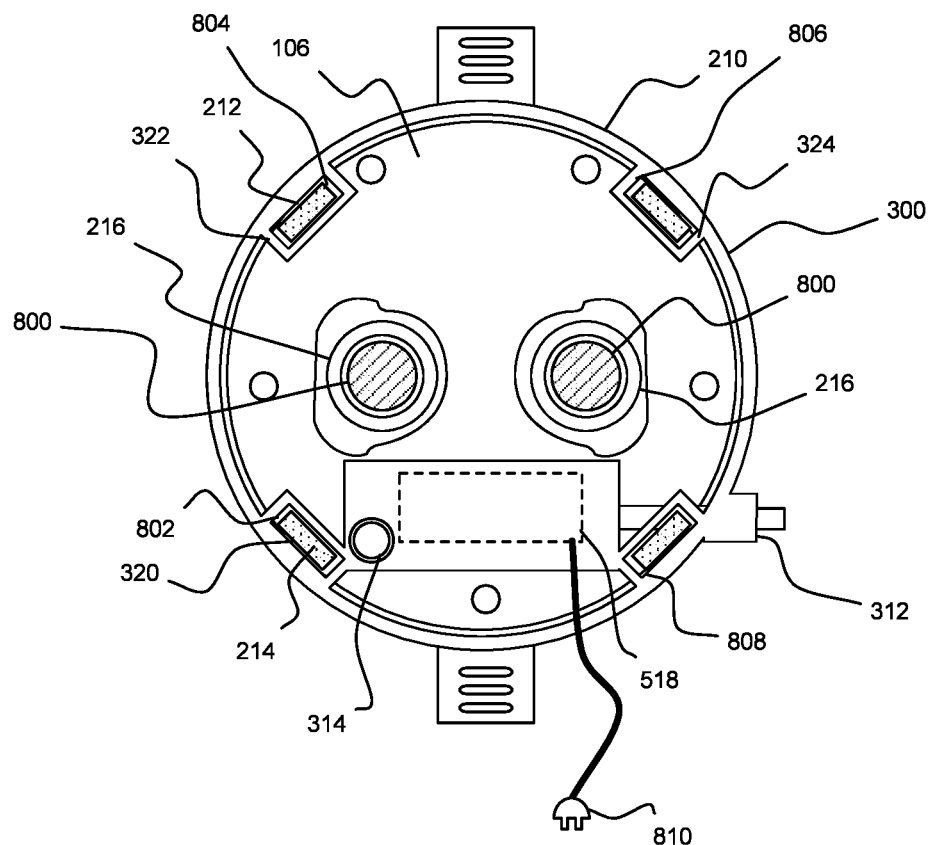
FIG. 8 shows a cross-sectional plan view of a wet-dry vacuum device and a pump accessory therefor.
Figure 9:
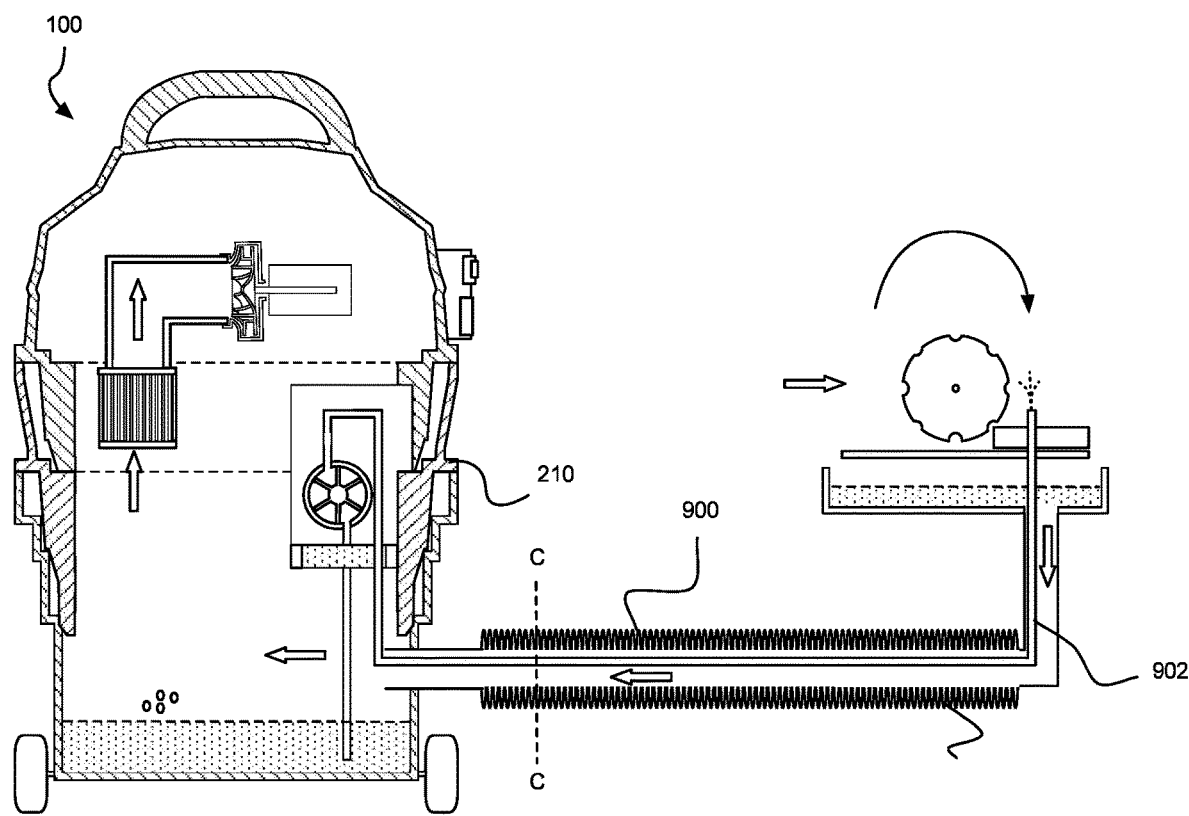
FIG. 9 shows a schematic side cross-sectional view of a wet-dry vacuum device and a pump accessory therefor.

Turning to FIGS. 9 and 10, this example will now be described in more detail. FIG. 9 shows a schematic side cross-sectional view of a wet-dry vacuum device 100 and a pump accessory 210 therefor. FIGS. 10a, 10b, 10c, 10d, 10e, 10f and 10g show cross-sectional views through the axis C-C of a hose 900. The wet-dry vacuum device 100 and a pump accessory 210 as shown in FIG. 9 are the same as the wet-dry vacuum device 100 and the pump accessory 210 described in reference to the previous examples shown in the FIGS. 1 to 8 except that the liquid flow path L has been modified.

Figure 10A:
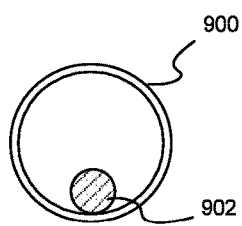
FIGS. 10a, 10b, 10c, 10d, 10e, 10f and 10g show cross-sectional views of a hose through the axis C-C.
Figure 10B:
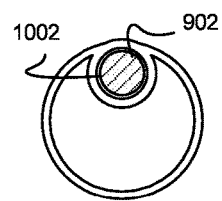
Figure 10C:
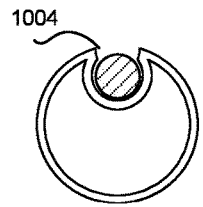
Figure 10D:
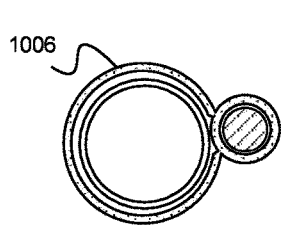
Figure 10E:
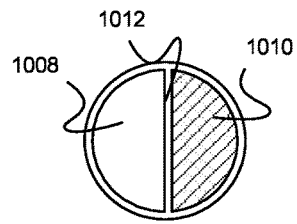

The wet-dry vacuum device 100 as shown in FIG. 9 comprises a vacuum hose 900 having a pump hose 902. In this way, the vacuum hose 900 and the pump hose 902 are combined into a single hose accessory. In some examples, as shown in FIGS. 10a, 10b, 10c, 10d, 10e, 10f, the pump hose 902 is positioned within or on the vacuum hose 900. Alternatively, the vacuum hose 900 is positioned within or on the pump hose 902 as shown in FIG. 10g. This means that the single hose accessory e.g. the vacuum hose 900 is able to provide both the dirty air flow path from the tool 604 into the wet-dry vacuum device 100 and the liquid flow path from the wet-dry vacuum device 100 to the tool 604.

In some examples, the pump hose 902 can be placed inside the vacuum hose 900. In one example the pump hose 902 is not attached to the vacuum 900 along the length of the pump hose 902 or the vacuum hose 900. This can allow the pump hose 902 to move relative to the vacuum hose 902 as the vacuum hose 900 is coiled and flexed. In some examples, the pump hose 902 and vacuum hose 900 are optionally connected to together at each end with a single connector (not shown).

Providing a single connecter for both the vacuum hose 900 and the pump hose 902 makes connecting and disconnecting the pump accessory 210 to the wet-dry vacuum device 100 easier. In some examples, the single connector comprises a profile similar to the cross sections shown in FIGS. 10a, 10b, 10c, 10d, 10e, 10f or 10g. In some other examples each of the vacuum hose 900 and the pump hose 902 have separate connectors (not shown) for respectively connecting the pump hose 902 and the vacuum hose 900 to the wet-dry vacuum device 100 and/or the pump accessory 210.

Figure 10F:
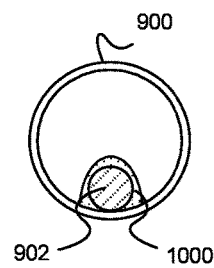
Figure 10G:
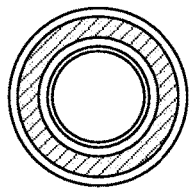

In some other examples, the pump hose 902 can be located inside the vacuum hose 900 with glue 1000 as shown in FIG. 10f. The glue 1000 is applied to the pump hose 902 and adheres to the inner surface of the vacuum hose 900. The pump hose 902 can be glued to the vacuum hose 900 intermittently along the length of the pump hose 902 or along the entire length of the pump hose 902.

In some other examples as shown in FIG. 10b, the pump hose 902 is fixed to the vacuum hose 900 in a conduit 1002 within the vacuum hose 900. The conduit 1002 is completely embedded within the vacuum hose 900 such that the conduit 1002 does not project out of the cross sectional profile of the vacuum hose 900. This means that the dirty air inlet 128 on wet-dry vacuum device 100 does not have to be modified.

Accordingly, the pump accessory 210 can easily be retrofitted by the user to an existing wet-dry vacuum device 100. FIG. 10b shows the pump hose 902 threaded through the conduit 1002, however in some alternative examples, the conduit 1002 can be used for the liquid flow path L without a separate pump hose 902. In other words, the vacuum hose 900 comprises an integral conduit 1002 which is suitable for conveying water from the wet-dry vacuum device 100 to the tool 604.

In some other examples, the vacuum hose 900 comprises an open conduit 1004. In this way the pump hose 902 is partially exposed and visible within the open conduit 1004. The mouth of the open conduit 1004 can be sized narrower than the diameter of the pump hose 902 so that the pump hose 902 is held within the open conduit 1004. In some examples, the pump hose 902 and the open conduit 1004 are flexible and the pump hose 902 can be press fit into the open conduit 1004 during manufacture. This can make assembly of the vacuum hose 900 and the pump hose 902 easier during manufacture. Furthermore, the open conduit 1004 is optionally completely embedded within the vacuum hose 900 such that the open conduit 1004 or the pump hose 902 do not project out of the cross sectional profile of the vacuum hose 900. Again this means that the dirty air inlet 128 on wet-dry vacuum device 100 does not have to be modified.

In another example, the pump hose 902 is adjacent to the vacuum hose 900 and the pump hose 902 and the vacuum hose 900 are both surrounded by a rubber sheaf 1006 or other flexible sleeve. The vacuum hose 900 and the pump hose 902 can be overmolded with rubber or other similar coating during manufacture to provide a single hose accessory.

In another example, the vacuum hose 900 and the pump hose 902 are respectively a first conduit 1008 and a second conduit 1010 separated by an internal wall 1012. The cross-sectional profile of the first conduit 1008 and the second conduit 1010 as shown in FIG. 10e are semi-circular, but the first conduit 1008 and the second conduit 1010 can comprise any suitable cross-sectional shape in other examples.

Optionally, the frame 300 comprises a plurality of frame guide legs 320, 322, 324 mounted thereto. Only three frame guide legs 320, 322, 324 are shown in FIG. 3, but in some examples, there are four frame guide legs 320, 322, 324 mounted circumferentially around the pump accessory 210. In other examples, there can be any number of frame guide legs 320, 322, 324 mounted on the pump accessory 210.

The frame guide legs 320, 322, 324 may be integral with the frame 300. In other examples the frame guide legs 320, 322, 324 are bolted or otherwise fastened to the frame 300. The frame guide legs 320, 322, 324 are identical to the upper legs 212, 214 as discussed with reference to the upper lid portion 106. This means that the frame guide legs 320, 322, 324 are mountable to the same features e.g. the leg slots 402 in the lower housing portion 104.

The frame guide legs 320, 322, 324 are positioned circumferentially around the frame 300 in the same positions as the upper legs 212, 214 on the upper lid portion 106. Since the frame guide legs 320, 322, 324 are the same shape, size and orientation as the upper legs 212, 214 on the upper lid portion 106, the frame guide legs 320, 322, 324 are configured to fit into the guide elements 400 e.g. the leg slots 402 of the lower housing portion 104. Accordingly, the leg slots 402 in the side wall 108 of the lower housing portion 104 guide the frame guide legs 320, 322, 324 and ensure that the pump accessory 210 is seated correctly on the lower housing portion 104.

In turn, the upper legs 212, 214 of the upper lid portion 106 are configured to engage the pump accessory 210. Engagement between the upper lid portion 106 and the pump accessory 210 will be discussed in reference to FIG. 8. FIG. 8 shows an underneath plan view of the pump accessory 210 and the upper lid portion 106 along the axis B-B (as shown in FIG. 5).

The frame 300 comprises a plurality of pockets 802, 804, 806, 808 for receiving the upper legs 212, 214 of the upper lid portion 106. For the purposes of clarity only two of the upper legs 212, 214 have been labelled in FIG. 8. As shown in the example illustrated in FIG. 8 there are four upper legs 212, 214 mounted on the upper lid portion 106. The upper legs 212, 214 respectively fit into four pockets 802, 804, 806, 808 mounted on the frame 300. The pockets 802, 804, 806, 808 are integral with the frame guide legs 320, 322, 324 so that the frame guide legs 320, 322, 324, the pockets 802, 804, 806, 808 and the upper legs 212, 214 of the upper lid portion 106 are in alignment. This means that the pump accessory 210 can be seated correctly on the lower housing portion 104 and the upper lid portion 106 can be seated correctly on the pump accessory 210.

Turning back to FIG. 3, the mechanism for securing the pump accessory 210 to the lower housing portion 104 and the upper lid portion 106 will be discussed. In some examples, the pump accessory 210 comprises one or more latch mechanisms 326. As shown in FIG. 3, only one latch mechanism 326 is labelled, however, in some examples there are two latch mechanisms 326 on opposite sides of the frame 300. In some other examples, the pump accessory 210 comprises the same number of latch mechanisms 326 as the lower housing portion 104 and the upper lid portion 106. In this way, each latch mechanism 114 on the lower housing portion 104 and the upper lid portion 106 can secure to a respective latch mechanism 326 mounted on the pump accessory 210.

As shown in FIG. 3, the latch mechanism 326 is only partially illustrated and for the purposes of clarity the pivotally mounted clips are not shown. Mounting holes 330 are shown in the cylindrical wall 306 for fastening the pivotally mounted clips to the frame 300.

The latch mechanism 326 will be discussed in further detail. The frame 300 comprises a fixed frame rib 328. The fixed frame rib 328 is configured to engage with the pivotally mounted clip 130 on the lower housing portion 104. In this way, the fixed frame rib 328 is identical to the second latch portion 132 mounted on the upper lid portion 106. Furthermore in some examples, the latch mechanism 326 comprises a pivotally mounted clip (not shown) which is identical to the first latch portion 130 mounted on the lower housing portion 104. In this way, the pivotally mounted clip of the latch mechanism 326 is configured to engage with the second latch portion 132 e.g. a fixed rib 132 integral with the upper lid portion 106.

Accordingly the pump accessory 210 comprises identical latch mechanisms 326 to the latch mechanisms 114 mounted on the lower housing portion 104 and the upper lid portion 106. This means that the latch mechanisms 326 and 114 are engageable with each other. However, in alternative examples, there are provided additional securing mechanisms different from the latch mechanism 114 mounted on the lower housing portion 104 and the upper lid portion 106. This means that the pump accessory 210 can be alternatively securely mounted between the lower housing portion 104 and the upper lid portion 106 without the latch mechanism 114 mounted on the lower housing portion 104 and the upper lid portion 106.

Operation of the wet-dry vacuum device 100 will now be discussed in reference to FIGS. 5 to 7. FIGS. 5 to 7 show schematic side cross-sectional views of the wet-dry vacuum device 100 and the pump accessory 210.

As shown in FIG. 5, the pump accessory 210 is mounted to the wet-dry vacuum device 100 and sandwiched between the upper lid portion 106 and the lower housing portion 104. The pump accessory 210, the upper lid portion 106 and the lower housing portion 104 overlap when assembled together and the dotted lines in FIG. 5 show the overlap therebetween.

During operation of the enhance wet mode operation, debris, dirt and liquid droplets 506 (e.g. water) are drawn into the tank 500 by the negative pressure generated by the motor-fan assembly 502. As mentioned above, this creates an airflow path within the wet-dry vacuum device 100 between the dirty air inlet 128 and a clean air exhaust holes 504.

The debris, dirt and liquid enter the tank 500 via the dirty air inlet 128 having been sucked up via the vacuum hose 522. When the airflow moves through the tank 500, the dirt, debris and liquid droplets 506 fall out of the airflow and are collected at the bottom of the tank 500.

The clean air is then sucked out of the tank 500 and ejected from the upper lid portion 106 via the clean air exhaust holes 504. The airflow path is represented in FIG. 5 with a series of solid white arrows.

The captured liquid 508 collects at the bottom of the tank 500 and is in fluid communication with the fluid inlet 314. The pump 518 is then actuated and the pump 518 pumps the captured liquid 508 out of the tank 500 via the pump hose 704. The liquid flow path in the pump hose 704 is represented in FIG. 5 with stick arrows This means that the capture liquid 508 in the tank can be recycled to the cutting tool 604.

FIG. 6 shows another example of the wet-dry vacuum device 100 and the pump accessory 210. The wet-dry vacuum device 100 and the pump accessory 210 are the same as shown in FIG. 5.

FIG. 6 shows the work area 600 having a cutting tool 604 being connected to the wet-dry vacuum device 100 and the pump accessory 210. The pump hose 704 is fixed in the work area 704 so that the recycled captured liquid 508 is directed to the cutting blade 606 of the cutting tool 604. In some examples, the work area 600 optionally comprises a tray 608 for catching the excess liquid. The excess liquid 610 flows off the cutting blade 606 and is collected in the tray 608. The tray 608 is coupled to the vacuum hose 522. When the motor-fan assembly 502 is actuated, the excess liquid 610 in the tray 608 is sucked into the tank 500.

In some examples, the excess liquid 610 is not sucked into the tank 500. In this case, the motor-fan assembly 502 is not actuated and the excess liquid 610 drains in to the tank 500 via the vacuum hose 522 under gravity. In this case, the tray 608 is mounted above the tank 500 so that the excess liquid 610 can drain under gravity. This may be desirable if the flow rate of liquid to cool or lubricate the cutting blade 606 is not high.

FIG. 7 shows another example of the wet-dry vacuum device 100 and the pump accessory 210. FIG. 7 shows the work area 600 having a cutting tool 604 being connected to the wet-dry vacuum device 100 and the pump accessory 210. FIG. 7 is the same as the arrangement shown in FIG. 6 except that there is no tray 608. Instead, the alternative nozzle 700 is coupled to the vacuum hose 522 and the liquid nozzle 702 of the pump hose 704 are positioned together near the cutting blade 606. This may make mounting the vacuum hose 522 and the pump hose 704 in the work area easier for the user.

In some examples, the user can adjust the liquid flow rate and the airflow rate so that sufficient liquid is delivered to the cutting blade 606 and the majority of the liquid is captured and recycled by the wet-dry vacuum device 100.

In some examples, the user may top up the level of the captured liquid 508 in the tank 500 periodically or constantly from another source. For example, if the recycled water splashes off the cutting blade 606, there may be water which cannot be captured by the vacuum hose 522. Alternatively, the flow rate of the liquid pumped by the pump 518 is greater than the rate of the liquid being returned to the tank 500 via the vacuum hose 522. This may mean that the captured liquid 508 may be depleted faster than it can be replenished. In this case, an additional hose can be coupled to the tank 500 to supply the tank 500 with extra water. In some examples, the frame 300 comprises an auxiliary fluid inlet (not shown) configured to be connected to a liquid supply e.g. a water hose to refill the tank 500.

In another example, two or more examples are combined. Features of one example can be combined with features of other examples.

Examples of the present disclosure have been discussed with particular reference to the examples illustrated. However it will be appreciated that variations and modifications may be made to the examples described within the scope of the disclosure.

What is claimed is:

1. A wet-dry vacuum device assembly comprising:
    a housing comprising a tank and a lid mountable on the tank via a latch mechanism;
    a motor-fan assembly mounted in the housing and arranged to generate an air flow along an airflow path between a dirty air inlet and a clean air exhaust;
    the tank positioned along the airflow path and arranged to capture liquid entrained in the dirty air flow; and
    a removable pump accessory mountable to the housing, the removable pump accessory comprising:
        a frame mountable to the housing;
        a pump;
        a fluid inlet in fluid communication with the tank and the pump; and
        a fluid outlet in fluid communication with the pump and connectable to an exterior hose;
        wherein the pump is arranged to move captured liquid in the tank from the fluid inlet to the fluid outlet;
    wherein when the removable pump accessory is not mounted to the housing, the latch mechanism couples the lid to the tank, and when the removable pump accessory is mounted to the housing, the latch mechanism couples the tank to the frame such that at least a portion of the frame is sandwiched between the tank and the lid.

2. The wet-dry vacuum device assembly according to claim 1, wherein the wet-dry vacuum device assembly comprises a vacuum hose in fluid communication with the dirty air inlet and the vacuum hose is positionable adjacent to the exterior hose.

3. The wet-dry vacuum device assembly according to claim 1, wherein the wet-dry vacuum device assembly comprises a vacuum hose in fluid communication with the dirty air inlet and the vacuum hose and the exterior hose are a single hose accessory.

4. The wet-dry vacuum device assembly according to claim 1, wherein the pump is electrically connectable to the same power supply as the motor-fan assembly.

5. The wet-dry vacuum device assembly according to claim 1, wherein the wet-dry vacuum device assembly comprises an actuator configured to actuate the motor-fan assembly and the pump.

6. The wet-dry vacuum device assembly according to claim 1, wherein the fluid inlet comprises an inlet hose extending to the bottom of the tank.

7. The wet-dry vacuum device assembly according to claim 1, wherein the removable pump accessory comprises a filter arranged to remove debris entrained in the dirty airflow.

8. The wet-dry vacuum device assembly according to claim 1, wherein the pump is a self-priming pump.

9. The wet-dry vacuum device assembly according to claim 1, wherein the frame includes a third exterior wall, at least a portion of which is exposed when the at least a portion of the frame is sandwiched between the tank and the lid.

10. A pump accessory for a wet-dry vacuum device, the pump accessory being removably mountable to a housing of the wet-dry vacuum device, the pump accessory comprising:
   a frame mountable to the housing of the wet-dry vacuum device;
   a pump;
   a fluid inlet in fluid communication with a tank of the wet-dry vacuum device arranged to capture liquid entrained in a dirty air flow and the pump;
   a fluid outlet in fluid communication with the pump and connectable to an exterior hose;
   wherein the pump is arranged to move captured liquid in the tank from the fluid inlet to the fluid outlet; and
   wherein the frame includes a third latch member that is configured to be latched by at least one of a first latch member on the tank and a second latch member on the lid that otherwise directly engage each other to couple the tank and the lid when the frame is removed from the wet-dry vacuum device.

11. The pump accessory for a wet-dry vacuum device according to claim 10, wherein the pump is electrically connectable to the same power supply as the motor-fan assembly.

12. The pump accessory for a wet-dry vacuum device according to claim 10, wherein the fluid inlet comprises an inlet hose extending to the bottom of the tank.

13. The pump accessory for a wet-dry vacuum device according to claim 10, wherein the removable pump accessory comprises a filter arranged to remove debris entrained in the dirty airflow.

14. The pump accessory for a wet-dry vacuum device according to claim 10, wherein the pump is a self-priming pump.

15. The pump accessory according to claim 10, wherein the frame includes an exterior wall, at least a portion of which is configured to be sandwiched between at least a portion of an exterior wall of the tank and a portion of an exterior wall of the lid when the frame is coupled to the housing between the tank and the lid.

16. A wet-dry vacuum device assembly comprising: a housing comprising a tank and a lid mountable on the tank via a latch mechanism that includes a first latch member coupled to the tank and a second latch member coupled to the lid;
   a motor-fan assembly mounted in the housing and arranged to generate an air flow along an airflow path between a dirty air inlet and a clean air exhaust;
   the tank positioned along the airflow path and arranged to capture liquid entrained in the dirty air flow; and
   a removable pump accessory mountable to the housing, the removable pump accessory comprising:
      a frame mountable to the housing;
      a third latch member coupled to the frame;
      a pump;
      a fluid inlet in fluid communication with the tank and the pump;
      a fluid outlet in fluid communication with the pump and connectable to an exterior hose;
      wherein the pump is arranged to move captured liquid in the tank along a liquid flow path from the fluid inlet to the fluid outlet; and
      wherein when the removable pump accessory is not mounted to the housing, the first latch member engages the second latch member to couple the lid to the tank, and when the removable pump accessory is mounted to the housing, at least one of the first latch member or the second latch member engages the third latch member such that at least a portion of the frame is mounted between the tank and the lid.

17. The wet-dry vacuum device assembly according to claim 16 further comprising a water filter accessory that is mountable to the removeable pump accessory or over the dirty air inlet on the housing.

18. The wet-dry vacuum device assembly according to claim 17, wherein the water filter accessory is positioned on the liquid flow path on a fluid inlet side of the pump.

19. The wet-dry vacuum device assembly according to claim 16, further comprising a fourth latch member coupled to the frame, wherein when the removable pump accessory is mounted to the housing, the first latch member engages the third latch member to couple the tank to the frame and the second latch member engages the fourth latch member to couple the frame to the lid.

20. The wet-dry vacuum device assembly according to claim 16, wherein when the removable pump accessory is mounted to the housing, at least a portion of the frame is sandwiched between the tank and the lid.

* * * * *